United States Patent
Yoshihashi et al.

(10) Patent No.: US 9,921,927 B2
(45) Date of Patent: Mar. 20, 2018

(54) REDUNDANT SYSTEM, REDUNDANCY METHOD, AND COMPUTER-READABLE RECORDING MEDIUM

(71) Applicant: FUJITSU LIMITED, Kawasaki-shi, Kanagawa (JP)

(72) Inventors: Yasuki Yoshihashi, Kobe (JP); Tomoaki Mizoo, Kobe (JP); Toshirou Ono, Nishinomiya (JP)

(73) Assignee: Fujitsu Limited, Kawasaki (JP)

( * ) Notice: Subject to any disclaimer, the term of this patent is extended or adjusted under 35 U.S.C. 154(b) by 99 days.

(21) Appl. No.: 14/721,059

(22) Filed: May 26, 2015

(65) Prior Publication Data

US 2015/0370662 A1    Dec. 24, 2015

(30) Foreign Application Priority Data

Jun. 20, 2014   (JP) ................................ 2014-127731

(51) Int. Cl.
*G06F 11/00*   (2006.01)
*G06F 11/20*   (2006.01)

(52) U.S. Cl.
CPC ...... *G06F 11/2028* (2013.01); *G06F 11/2041* (2013.01); *G06F 11/2048* (2013.01); *G06F 11/2097* (2013.01); *G06F 2201/80* (2013.01); *G06F 2201/82* (2013.01); *G06F 2201/84* (2013.01)

(58) Field of Classification Search
CPC .............. G06F 11/2056; G06F 11/2058; G06F 11/2094; G06F 11/2082
See application file for complete search history.

(56) References Cited

U.S. PATENT DOCUMENTS

| | | | |
|---|---|---|---|
| 7,739,540 B2 | 6/2010 | Akutsu et al. | |
| 7,802,131 B2 * | 9/2010 | Watanabe | G06F 11/2069 714/6.11 |
| 7,925,914 B2 | 4/2011 | Akutsu et al. | |

(Continued)

FOREIGN PATENT DOCUMENTS

| | | |
|---|---|---|
| JP | 6-95905 A | 4/1994 |
| JP | 2005-267216 A | 9/2005 |

(Continued)

OTHER PUBLICATIONS

Japanese Office Action dated Oct. 3, 2017 for corresponding Japanese Patent Application No. 2014-127731, with English Translation, 6 pages.

*Primary Examiner* — Philip Guyton
(74) *Attorney, Agent, or Firm* — Fujitsu Patent Center

(57) ABSTRACT

A primary system includes a first node and a second node that backs up the first node. A secondary system includes a third node and a fourth node that backs up the third node. The first node transmits data update information generated in response to a data update in the first node, to the second node and the third node. The fourth node determines a degree of progress in transactions indicated by data update information obtained through the second node and a degree of progress in transactions indicated by data update information obtained through the third node, identifies data update information indicating a further progressed transaction, and reflects the data update information in stored data of the fourth node.

5 Claims, 17 Drawing Sheets

(56) References Cited

U.S. PATENT DOCUMENTS

| | | | |
|---|---|---|---|
| 8,281,179 B2 | 10/2012 | Akutsu et al. | |
| 8,312,236 B2* | 11/2012 | Benhase | G06F 11/2058 |
| | | | 711/162 |
| 2004/0250034 A1* | 12/2004 | Yagawa | G06F 11/2058 |
| | | | 711/162 |
| 2004/0260736 A1* | 12/2004 | Kern | G06F 11/2058 |
| 2005/0210078 A1 | 9/2005 | Maruyama et al. | |
| 2006/0010300 A1 | 1/2006 | Arakawa et al. | |
| 2010/0036896 A1* | 2/2010 | Nakagawa | G06F 11/1456 |
| | | | 707/E17.009 |
| 2010/0121823 A1 | 5/2010 | Shiozawa et al. | |
| 2011/0251993 A1* | 10/2011 | Kondo | G06F 11/1456 |
| | | | 707/613 |
| 2016/0004616 A1* | 1/2016 | Narita | G06F 12/00 |
| | | | 714/6.3 |

FOREIGN PATENT DOCUMENTS

| | | |
|---|---|---|
| JP | 2006-23889 | 1/2006 |
| JP | 2008-134986 | 6/2008 |
| JP | 2008-242715 | 10/2008 |
| JP | 2010-113617 A | 5/2010 |
| JP | 2013-206072 | 10/2013 |

\* cited by examiner

REDUNDANT SYSTEM, REDUNDANCY METHOD, AND COMPUTER-READABLE RECORDING MEDIUM

CROSS-REFERENCE TO RELATED APPLICATION

This application is based upon and claims the benefit of priority of the prior Japanese Patent Application No. 2014-127731, filed on Jun. 20, 2014, the entire contents of which are incorporated herein by reference.

FIELD

The embodiments discussed herein are related to a redundant system, a redundancy method, and a redundancy program.

BACKGROUND

It is common that various types of nodes such as a web server, an application server, and a DB (DataBase) server are installed in a data center and each node is made redundant for disasters and failures.

For example, there is known a redundancy technique in which, for a node in a data center, a node in a primary system and a node in a secondary system are prepared, and when the node in the primary system has broken down, the node in the secondary system takes over the processes of the broken-down node in the primary system to continue the processes, instead of the broken-down node in the primary system.

In addition, there is known a technique in which a data center in a secondary system for a backup to a data center in a primary system is provided, and when the data center in the primary system has experienced a disaster, the data center in the secondary system for a backup takes over processes, by which processes performed by the data center in the primary system continue.

[Patent Document 1] Japanese Laid-open Patent Publication No. 2008-134986

However, when a node that transfers logs from the data center in the primary system to the data center in the secondary system has broken down, logs are not transferred to the data center in the secondary system until the node recovers. When the data center in the primary system has experienced a disaster during a period before the broken-down node recovers, data lost occurs.

To inhibit data lost upon the occurrence of both of a breakdown in the node and a data center's experience of a disaster, it is considered to provide a plurality of paths through which logs are transferred between the data centers. However, in that case, a node that receives logs through two paths is present in the data center in the secondary system. In this case, unless the node that receives logs through the two paths appropriately selects which one of the logs through the two paths is to be reflected, an increase in the amount of data lost is caused.

SUMMARY

According to an aspect of the embodiments, a redundant system includes a primary system including a first node and a second node that backs up the first node; and a secondary system including a third node and a fourth node that backs up the third node. The first node in the primary system includes: a processor that executes a first process including transmitting data update information to the second node and the third node, the data update information being generated in response to a data update in the first node, and the fourth node in the secondary system includes: a processor that executes a second process including: determining a degree of progress in transactions indicated by the data update information obtained through the second node and a degree of progress in transactions indicated by the data update information obtained through the third node, specifying data update information indicating a further progressed transaction, and reflecting the specified data update information to stored data of the fourth node.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. Note that the invention is not limited by the embodiments.

[a] First Embodiment

Exemplary Overall Configuration

Figure 1:
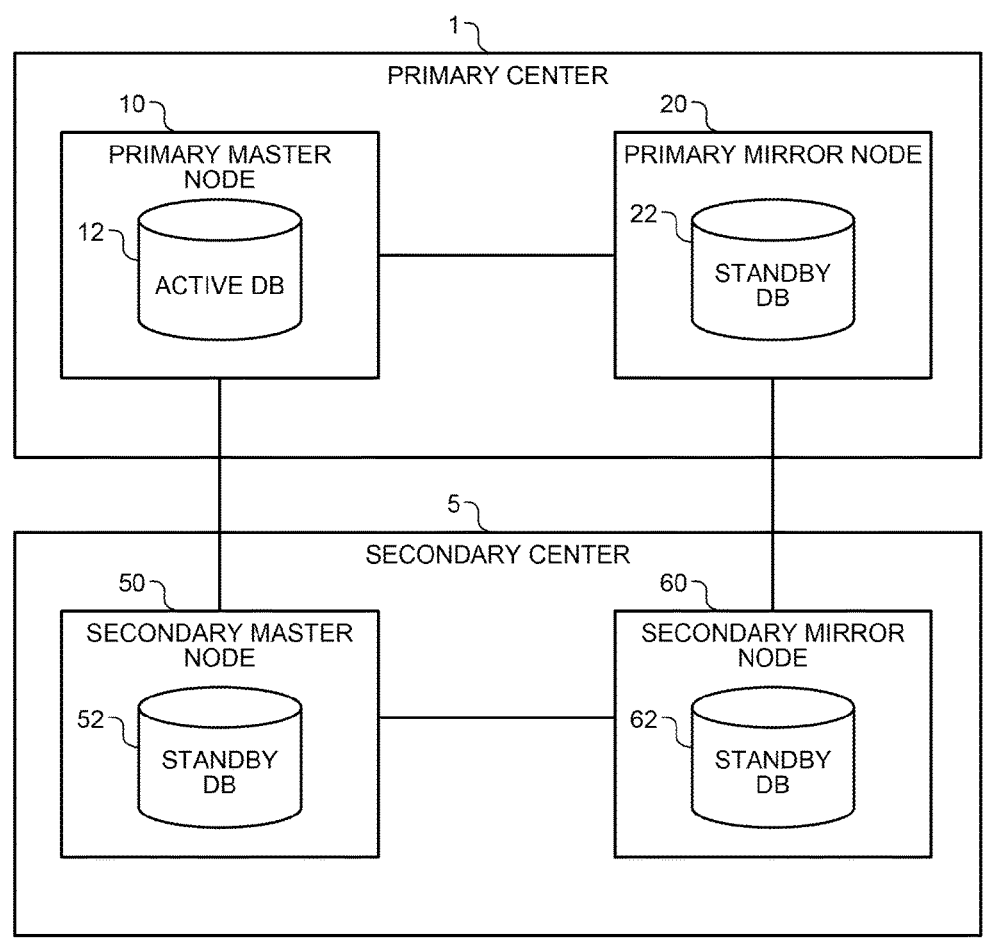
FIG. 1 is a diagram illustrating an exemplary overall configuration of a redundant system according to a first embodiment.

FIG. 1 is a diagram illustrating an exemplary overall configuration of a redundant system according to a first embodiment. As illustrated in FIG. 1, the system is a redundant system in which a data center is mirrored by performing a DB quad-redundancy function, i.e., a DB quadruplication function, and includes a primary center 1 and a secondary center 5 which are data centers.

The primary center 1 is a data center including a primary master node 10 and a primary mirror node 20, and has a redundant configuration for performing DB mirroring. Likewise, the secondary center 5 is a data center including a secondary master node 50 and a secondary mirror node 60, and has a redundant configuration for performing DB mirroring. The secondary center 5 functions as a backup to the primary center 1. Note that each node is an example of a DB server, a storage system, etc.

The primary master node 10 is an example of a first node having an active DB 12 to which updates by business operations are made, and is activated as a primary node at normal operation. When the primary master node 10 updates the active DB 12 by a business operation application, etc., the primary master node 10 extracts update information indicating, for example, differences between before and after the update. For example, the primary master node 10 transmits an update log indicating an updated content, to the primary mirror node 20 in synchronization with the update to the active DB 12. In addition, the primary master node 10 creates an update file including a plurality of update logs, and transmits the update file to the secondary master node 50 at predetermined intervals.

The primary mirror node 20 is an example of a second node having a standby DB 22 which is updated in synchronization with the active DB 12, and functions as a backup to the primary master node 10 at normal operation. When the primary mirror node 20 receives an update log as update information from the primary master node 10, the primary mirror node 20 updates the standby DB 22 using the received update log. Thereafter, the primary mirror node 20 creates an update file including update logs received from the primary master node 10, and transmits the update file to the secondary mirror node 60 at predetermined intervals.

The secondary master node 50 is an example of a third node having a standby DB 52 that stores information equivalent to the active DB 12. At normal operation, the secondary master node 50 functions as a master node in a secondary system, as primary center 1's measures against disasters, etc. When the secondary master node 50 receives an update file as update information from the primary master node 10, the secondary master node 50 extracts update logs from the received update file and updates the standby DB 52 using the extracted update logs. Thereafter, the secondary master node 50 creates an update file including the plurality of update logs received from the primary master node 10, and transmits the update file to the secondary mirror node 60 at predetermined intervals.

The secondary mirror node 60 is an example of a fourth node having a standby DB 62 that stores information equivalent to the active DB 12. At normal operation, the secondary mirror node 60 functions as a mirror node in the secondary system, as primary center 1's measures against disasters, etc. The secondary mirror node 60 receives an update file as update information from the primary mirror node 20 and receives an update log from the secondary master node 50. Then, the secondary mirror node 60 updates the standby DB 62 using either one of the pieces of received update information.

In such a state, the primary master node 10 in a primary system transmits data update information which is generated in response to a data update in the primary master node 10, to the primary mirror node 20 and the secondary master node 50.

Then, the secondary mirror node 60 in the secondary center 5 determines the degree of progress in transactions indicated by data update information which is obtained through the primary mirror node 20, and the degree of progress in transactions indicated by data update information which is obtained through the secondary master node 50. Thereafter, the secondary mirror node 60 identifies data update information indicating further progressed transactions, and reflects the data update information in stored data of the secondary mirror node 60.

Specifically, the secondary mirror node 60 which configures a quad-redundant DB receives update information transmitted from the primary master node 10, through two routes from the primary mirror node 20 and the secondary master node 50, and identifies and reflects update information indicating transactions whose processes have progressed further. Therefore, the secondary mirror node 60 can suppress data lost in reflection of update information.

Functional Configurations of the Nodes

Next, the functional configurations of the nodes illustrated in FIG. 1 will be described. Although here, as an example, functional configurations in the state of FIG. 1 will be described, the functional configurations are not limited thereto, and the nodes can also have the same functional configuration.

Functional Configuration of the Primary Center

Figure 2:
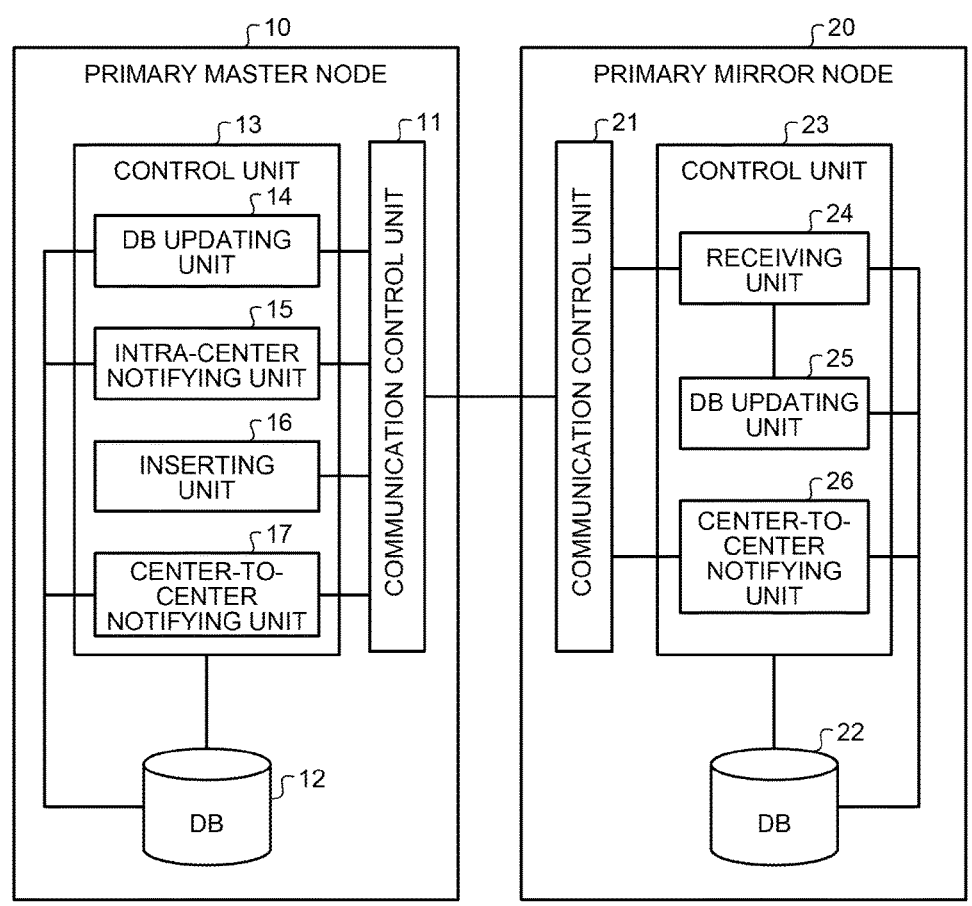
FIG. 2 is a functional block diagram illustrating the functional configurations of nodes in a primary center.

FIG. 2 is a functional block diagram illustrating the functional configurations of the nodes in the primary center. Here, the primary master node 10 and the primary mirror node 20 included in the primary center 1 will be described.

Functional Configuration of the Primary Master Node

As illustrated in FIG. 2, the primary master node 10 includes a communication control unit 11, a DB 12, and a control unit 13.

The communication control unit 11 is a processor that controls communication with the primary mirror node 20 and with the secondary master node 50, and is a network interface, for example. For example, the communication control unit 11 transmits update information of the DB 12 to the primary mirror node 20 and the secondary master node 50.

The DB 12 is a database that stores business operation information, etc., and corresponds to the active DB 12 illustrated in FIG. 1. Updates by business operations are made to the DB 12. The DB 12 is provided in a storage apparatus, e.g., a hard disk. The DB 12 corresponds to the active DB 12.

The control unit 13 is a processor that controls the whole process of the primary master node 10, and is an example of a processor, for example. The control unit 13 performs the function of implementing a DB redundant system between the primary master node 10 and the primary mirror node 20, and performs the function of implementing a DB redundant system between the primary master node 10 and the secondary master node 50. Namely, the control unit 13 executes an application that implements a DB dual-redundancy function in the primary center 1, and an application that implements DB quad-redundancy function across the centers.

The control unit 13 includes a DB updating unit 14, an intra-center notifying unit 15, an inserting unit 16, and a center-to-center notifying unit 17. These processors are an example of processes performed by an electronic circuit included in the processor or by the processor.

The DB updating unit 14 is a processor that updates the DB 12. For example, the DB updating unit 14 updates stored data in the DB 12 along with execution of an application, for example.

The intra-center notifying unit 15 is a processor that transmits update information of the DB 12 to the primary mirror node 20 in the same system, in synchronization with an update to the DB 12. Specifically, when the DB 12 is updated, the intra-center notifying unit 15 extracts a difference from information obtained before and after the update. Then, the intra-center notifying unit 15 transmits an update log indicating differential information, as update information to the primary mirror node 20.

Figure 3:
FIG. 3 is a diagram illustrating an example of a user log.
Figure 4:
FIG. 4 is a diagram illustrating an example of a control log.

Now, an example of an update log will be described. FIG. 3 is a diagram illustrating an example of a user log. FIG. 4 is a diagram illustrating an example of a control log. As illustrated in FIG. 3, the user log which is an example of an update log is a log indicating DB update information and consists of "a header, a user log display, a variable-length part, a variable-length part 2, and BC key information".

In the "header", information indicating an update log, a creation date and time, etc., are set. In the "user log display", information indicating that it is a user log is set. The "variable-length part" and the "variable-length part 2" are information indicating a DB update content, e.g., a specific record position, data before and after the update, and differential information. In the "BC key information", information about DB dual-redundancy between the primary master node 10 and the primary mirror node 20 is set. For example, checksum information or the serial number of the log is set.

As illustrated in FIG. 4, the control log which is an example of an update log is a log indicating a DB control process, e.g., a rollback process, and consists of "a header, a control log display, and COMMIT specification". In the "header", information indicating an update log, a creation date and time, etc., are set. In the "control log display", information indicating that it is a control log is set. In the "COMMIT specification", information indicating a specific control process, e.g., transaction information, is set.

As described above, when the DB 12 is updated, the intra-center notifying unit 15 creates an update log, such as the above-described user log or control log, according to updated information. Then, the intra-center notifying unit 15 transmits the created update log to the primary mirror node 20. In addition, the intra-center notifying unit 15 notifies the center-to-center notifying unit 17 of the created update log. Namely, the intra-center notifying unit 15 notifies of DB update information in synchronization with the update to the DB 12, within the same center.

The inserting unit 16 is a processor that inserts, when update information generated in response to a DB data update in the primary master node 10 is transmitted to the primary mirror node 20 and the secondary master node 50, one or a plurality of pieces of delimiter information indicating a boundary between update processing units, into both of transmit data.

Specifically, the inserting unit 16 periodically generates a checkpoint which is common determination information between the nodes and which determines an update log arrival status. Then, the inserting unit 16 transmits the checkpoints generated periodically to the primary mirror node 20 and notifies the center-to-center notifying unit 17 of the checkpoints. Note that, for the checkpoint as used herein, a recovery point log which is an example of an update log is used. Note also that, as an example of "periodically", for example, five seconds can be set, but the time interval for generating checkpoints may be changed as appropriate.

Figure 5:
FIG. 5 is a diagram illustrating an example of a recovery point log.

FIG. 5 is a diagram illustrating an example of a recovery point log. As illustrated in FIG. 5, the recovery point log is a log indicating a checkpoint that determines an update log arrival status, and consists of "a header, a control log display, and RP information". In the "header", information indicating an update log, a creation date and time, etc., are set. In the "control log display", information indicating that it is a recovery point log is set. The "RP information" is information identifying a recovery point and includes an "identifier" and a "serial number". The "identifier" is information identifying that it is checkpoint information of the DB quad-redundancy function. The "serial number" is a 23-byte fixed positive number and is a unique serial number in the DB quad-redundant system. For example, a larger number indicates a newer log.

The center-to-center notifying unit 17 is a processor that puts together pieces of update information of the DB 12 and periodically transmits the update information to the secondary master node 50 in a different system. Specifically, the center-to-center notifying unit 17 creates an update file in which update logs obtained from the intra-center notifying unit 15 and recovery point logs obtained from the inserting unit 16 are put together in chronological order, at 10-second intervals, for example, and transmits the update file to the secondary master node 50. Namely, between different centers, the center-to-center notifying unit 17 generates update information in which DB update information and checkpoints are periodically put together, and notifies of the update information asynchronously with an update to the DB 12.

Figure 6:
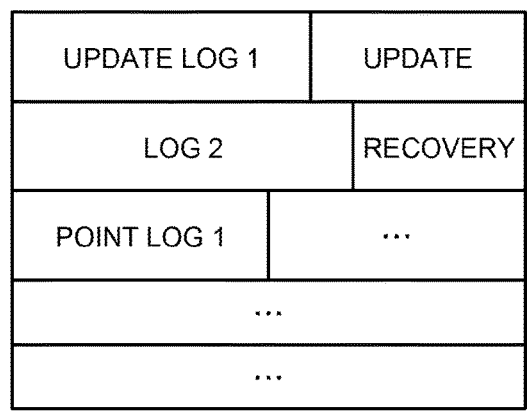
FIG. 6 is a diagram illustrating an example of an update file transmitted by communication between systems.

FIG. 6 is a diagram illustrating an example of an update file transmitted by communication between the systems. As illustrated in FIG. 6, the update file consists of update logs and a recovery point log. In the example of FIG. 6, the update file includes an update log 1, an update log 2, a recovery point log 1, etc., and indicates that the logs are created in this order. Note that the update log 1 and the update log 2 correspond to the above-described user log or control log, and the recovery point log 1 corresponds to the above-described recovery point log.

Functional Configuration of the Primary Mirror Node

As illustrated in FIG. 2, the primary mirror node 20 includes a communication control unit 21, a DB 22, and a control unit 23.

The communication control unit 21 is a processor that controls communication with the primary master node 10 and with the secondary mirror node 60, and is a network interface, for example. For example, the communication control unit 21 receives DB update information from the primary master node 10 and transmits the DB update information to the secondary mirror node 60.

The DB 22 is a database that stores, for example, the same business operation information as that in the DB 12 of the primary master node 10, and corresponds to the standby DB 22 illustrated in FIG. 1. The DB 22 is updated in synchronization with the DB 12. Note that the DB 22 is provided in a storage apparatus, e.g., a hard disk. The DB 22 corresponds to the standby DB 22.

The control unit 23 is a processor that controls the whole process of the primary mirror node 20, and is an example of a processor, for example. The control unit 23 performs the function of implementing a DB redundant system between the primary master node 10 and the primary mirror node 20, and performs the function of implementing a DB redundant system between the primary mirror node 20 and the secondary mirror node 60. Namely, the control unit 23 executes an application that implements a DB dual-redundancy function in the primary center 1, and an application that implements DB quad-redundancy function across the centers.

The control unit 23 includes a receiving unit 24, a DB updating unit 25, and a center-to-center notifying unit 26. These processors are an example of processes performed by an electronic circuit included in the processor or by the processor.

The receiving unit 24 is a processor that receives update information of the DB 12 from the primary master node 10. Specifically, the receiving unit 24 receives an update log which is synchronized with an update to the DB 12 of the primary master node 10, and notifies the DB updating unit 25 and the center-to-center notifying unit 26 of the update log. In addition, when the receiving unit 24 receives a recovery point log, the receiving unit 24 notifies the center-to-center notifying unit 26 of the recovery point log.

The DB updating unit 25 is a processor that updates the DB 22 using data update information notified from the primary master node 10. For example, the DB updating unit 25 extracts, for example, a record to be updated and updated data from a variable-length part, etc., in a received update log, and updates the DB 22 according to the extracted information. The DB updating unit 25 updates the DB 22 every time an update log is received. As a result, the DB 22 can be synchronized with the DB 12 of the primary master node 10 and functions as a mirroring DB.

The center-to-center notifying unit 26 is a processor that puts together pieces of update information of the DB 22 and periodically transmits the update information to the secondary mirror node 60 in a different system. Specifically, the center-to-center notifying unit 26 creates an update file in which update logs and recovery point logs received from the primary master node 10 are put together in chronological order, at 10-second intervals, for example, and transmits the update file to the secondary mirror node 60. For example, the center-to-center notifying unit 26 creates an update file illustrated in FIG. 6 and transmits the update file to the secondary mirror node 60.

Functional Configuration of the Secondary Center

Figure 7:
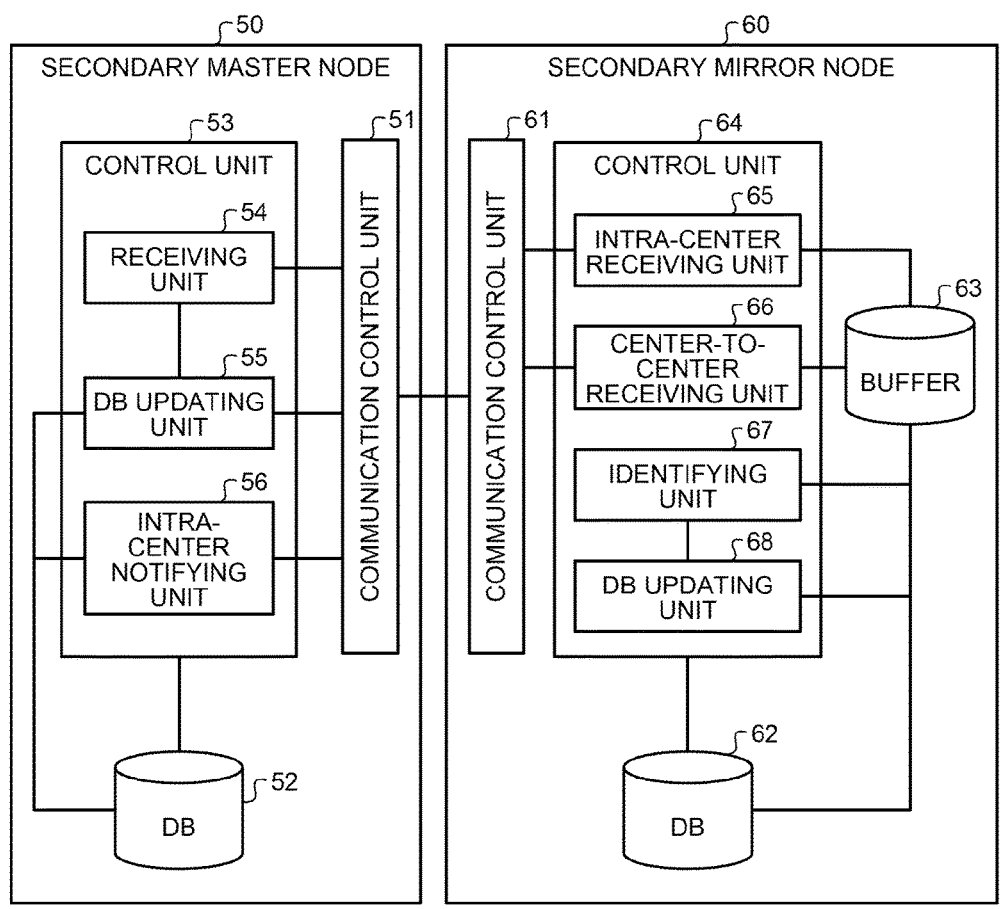
FIG. 7 is a functional block diagram illustrating the functional configurations of nodes in a secondary center.

FIG. 7 is a functional block diagram illustrating the functional configurations of the nodes in the secondary center. Here, the secondary master node 50 and the secondary mirror node 60 included in the secondary center 5 will be described.

Functional Configuration of the Secondary Master Node

As illustrated in FIG. 7, the secondary master node 50 includes a communication control unit 51, a DB 52, and a control unit 53.

The communication control unit 51 is a processor that controls communication with the primary master node 10 and with the secondary mirror node 60, and is a network interface, for example. For example, the communication control unit 51 receives an update file including various types of update logs, as update information of the DB 12 of the primary master node 10, from the primary master node 10. In addition, the communication control unit 51 transmits the update logs of the DB 12 of the primary master node 10 to the secondary mirror node 60.

The DB 52 is a database that stores business operation information, etc., and corresponds to the standby DB 52 illustrated in FIG. 1. The DB 52 is updated asynchronously with an update to the DB 12, using update information notified from the primary master node 10. Note that the DB 52 is provided in a storage apparatus, e.g., a hard disk.

The control unit 53 is a processor that controls the whole process of the secondary master node 50, and is an example of a processor, for example. The control unit 53 executes an application that implements the entire DB quad-redundant system across the centers illustrated in FIG. 1, and executes an application that implements the DB dual-redundancy function in the secondary center 5. The DB 52 corresponds to the standby DB 52.

The control unit 53 includes a receiving unit 54, a DB updating unit 55, and an intra-center notifying unit 56. These processors are an example of processes performed by an electronic circuit included in the processor or by the processor.

The receiving unit 54 is a processor that receives update information of the DB 12 from the primary master node 10. Specifically, the receiving unit 54 receives an update file including update logs at predetermined intervals. Then, the receiving unit 54 outputs the received update file to the DB updating unit 55.

The DB updating unit 55 is a processor that updates the DB 52 according to data update information notified from the primary master node 10. For example, the DB updating unit 55 extracts, from an update file received by the receiving unit 54, various types of logs included in the update file.

Then, the DB updating unit 55 identifies user logs and control logs among the extracted logs. Thereafter, the DB updating unit 55 reflects data updates identified by the respective logs, in the DB 52 in chronological order in which the logs are created. In addition, when the DB updating unit 55 extracts various types of logs from the update file, the DB updating unit 55 outputs the extracted logs to the intra-center notifying unit 56 in chronological order.

For example, assuming that an update file of FIG. 6 is received, the DB updating unit 55 extracts an update log 1, an update log 2, and a recovery point log 1 from the update file. Then, the DB updating unit 55 first reflects a data update identified by the update log 1 in the DB 52 and then reflects a data update identified by the update log 2 in the DB 52. Meanwhile, the DB updating unit 55 outputs the extracted update log 1, update log 2, and recovery point log 1 to the intra-center notifying unit 56.

The intra-center notifying unit 56 is a processor that transmits update information of data reflected in the DB 52 to the secondary mirror node 60. Specifically, the intra-center notifying unit 56 transmits update logs and recovery point logs which are received from the primary master node 10, to the secondary mirror node 60 in chronological order in which the logs are created.

Describing using the above-described example, the intra-center notifying unit 56 receives an update log 1, an update log 2, and a recovery point log 1 in turn from the DB updating unit 55. Then, the intra-center notifying unit 56 first transmits the update log 1 to the secondary mirror node 60, and then transmits the update log 2 to the secondary mirror node 60 and transmits the last recovery point log 1 to the secondary mirror node 60.

Functional Configuration of the Secondary Mirror Node

As illustrated in FIG. 7, the secondary mirror node 60 includes a communication control unit 61, a DB 62, a buffer 63, and a control unit 64.

The communication control unit 61 is a processor that controls communication with the primary mirror node 20 and with the secondary master node 50, and is a network interface, for example. For example, the communication control unit 61 receives data update information from both of the primary mirror node 20 and the secondary master node 50.

The DB 62 is a database that stores business operation information, etc., and corresponds to the standby DB 62 illustrated in FIG. 1. The DB 62 is updated asynchronously with an update to the DB 12 of the primary master node 10, using update information notified from the primary master node 10. On the other hand, the DB 62 is updated in synchronization with an update to the DB 52 of the secondary master node 50. Note that the DB 62 is provided in a storage apparatus, e.g., a hard disk. The DB 62 corresponds to the standby DB 62.

The buffer 63 is a storage area that temporarily stores update information received from the primary mirror node 20 by communication between the centers and update information received from the secondary master node 50 by communication within the center. Note that the buffer 63 is provided in a storage apparatus, e.g., a hard disk or a memory.

The control unit 64 is a processor that controls the whole process of the secondary mirror node 60, and is an example of a processor, for example. The control unit 64 executes an application that implements the entire DB quad-redundant system across the centers illustrated in FIG. 1, and executes an application that implements the DB dual-redundancy function in the secondary center 5.

The control unit 64 includes an intra-center receiving unit 65, a center-to-center receiving unit 66, an identifying unit 67, and a DB updating unit 68. These processors are an example of processes performed by an electronic circuit included in the processor or by the processor.

The intra-center receiving unit 65 is a processor that receives data update information from the secondary master node 50. Specifically, the intra-center receiving unit 65 receives update logs and recovery point logs from the secondary master node 50 and stores the update logs and the recovery point logs in the buffer 63 in chronological order of log creation date and time. Describing using the above-described example, the intra-center receiving unit 65 receives an update log 1, an update log 2, and a recovery point log 1 in turn from the secondary master node 50 and stores the update log 1, the update log 2, and the recovery point log 1 in the buffer 63 in the order of reception.

The center-to-center receiving unit 66 is a processor that receives data update information from the primary mirror node 20. Specifically, the center-to-center receiving unit 66 receives an update file including update logs and recovery point logs, from the primary mirror node 20. Then, the center-to-center receiving unit 66 extracts various types of logs from the update file and stores the logs in the buffer 63 in the order of creation date and time.

The identifying unit 67 is a processor that identifies update information whose transactions have progressed further from among update information of the DB 12 obtained through the secondary master node 50 and update information of the DB 12 obtained from the primary mirror node 20. Specifically, the identifying unit 67 identifies update information whose transactions have progressed further, according to the number of transactions indicated by update information later than the last recovery point log included in the update information.

Figure 8:
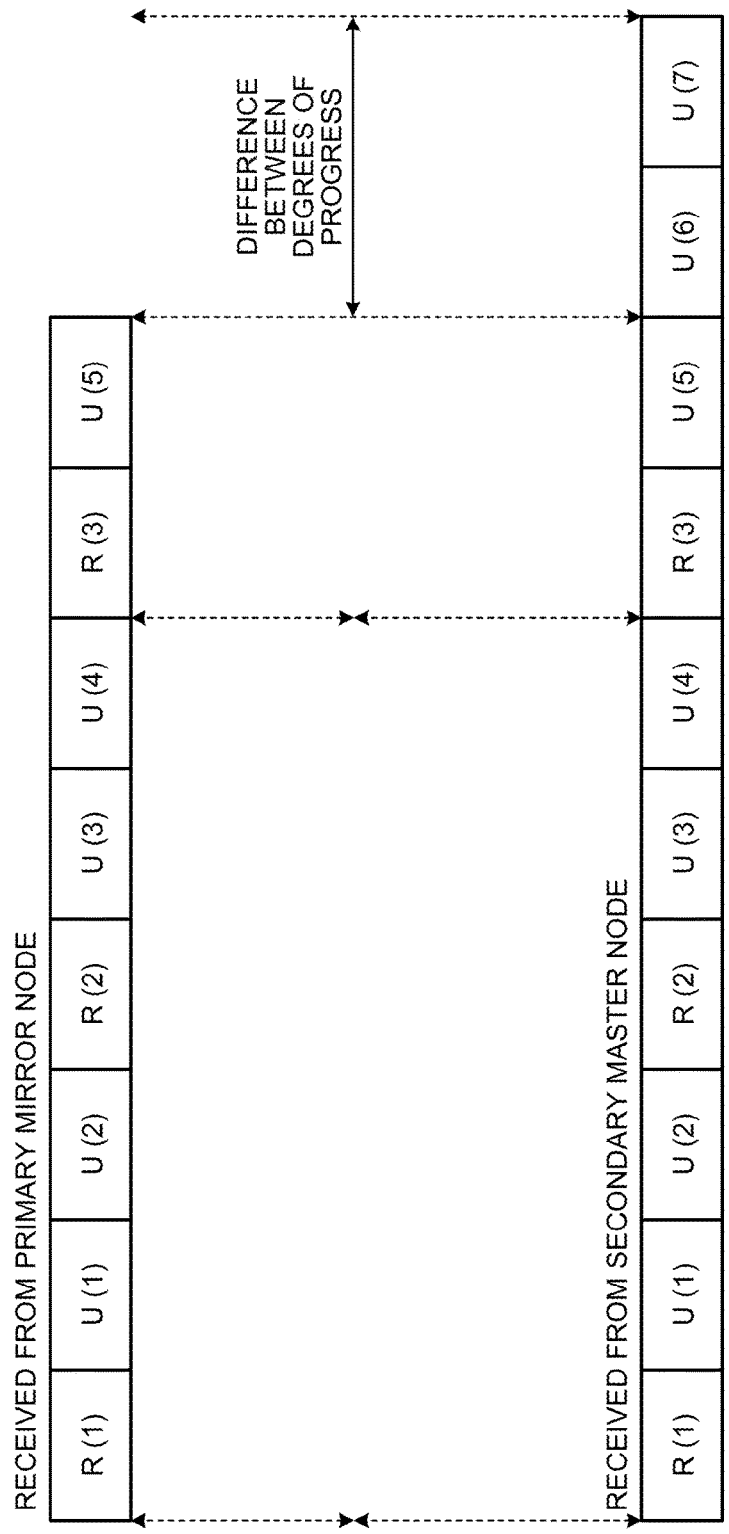
FIG. 8 is a diagram describing an example of a comparison between the degrees of progress in transactions made by a secondary mirror node.

Now, an example of a determination of the degrees of progress in transactions will be described. FIG. 8 is a diagram describing an example of a comparison between the degrees of progress in transactions made by the secondary mirror node 60. A "R(number)" illustrated in FIG. 8 indicates a recovery point log, and "(number)" indicates the order of receiving the recovery point log. Likewise, a "U(number)" indicates an update log such as a user log or a control log, and "(number)" indicates the order of receiving the update log.

In the example of FIG. 8, the identifying unit 67 identifies that update information is received from the primary mirror node 20 in order of R(1), U(1), U(2), R(2), U(3), U(4), R(3), and U(5). In addition, the identifying unit 67 identifies that update information is received from the secondary master node 50 in order of R(1), U(1), U(2), R(2), U(3), U(4), R(3), U(5), U(6), and U(7), by extracting various types of logs from an update file.

In this case, the identifying unit 67 determines, for the update information from the primary mirror node 20, that there is only one update log "U(5)" later than "R(3)" which is the last recovery point log in the update information. On the other hand, the identifying unit 67 determines, for the update information from the secondary master node 50, that there are three update logs, "U(5)", "U(6)", and "U(7)", later than "R(3)" which is the last recovery point log in the update information.

That is, for the update information from the primary mirror node 20 and the update information from the secondary master node 50, the identifying unit 67 identifies "U(6)" and "U(7)" as differences between the degrees of progress in transactions. As a result, the identifying unit 67 identifies that the transactions of the update information from the secondary master node 50 have progressed further, and thus notifies the DB updating unit 68 of the update information.

The DB updating unit 68 is a processor that updates the DB 62 using data update information whose transactions have progressed further. Specifically, the DB updating unit 68 extracts data update information from update logs notified from the identifying unit 67 and reflects the data update information in the DB 62. In the case of the above-described example, the DB updating unit 68 sequentially reads update logs received by the intra-center receiving unit 65 from the buffer 63 in chronological order, and sequentially reflects data updates identified by the respective logs, in the DB 62.

Flow of Processes

Next, processes performed by each node will be described. Here, a DB update process and an update information notification process which are performed by each node will be described. Note that although here, as an example, an example is described in which a checkpoint (recovery point log) is created after a DB update, the configuration is not limited thereto. For example, a DB update process and a checkpoint creation process can be performed in parallel or can also be performed using different flowcharts.

Notification Process from the Primary Master Node 10 to the Primary Mirror Node 20

Figure 9:
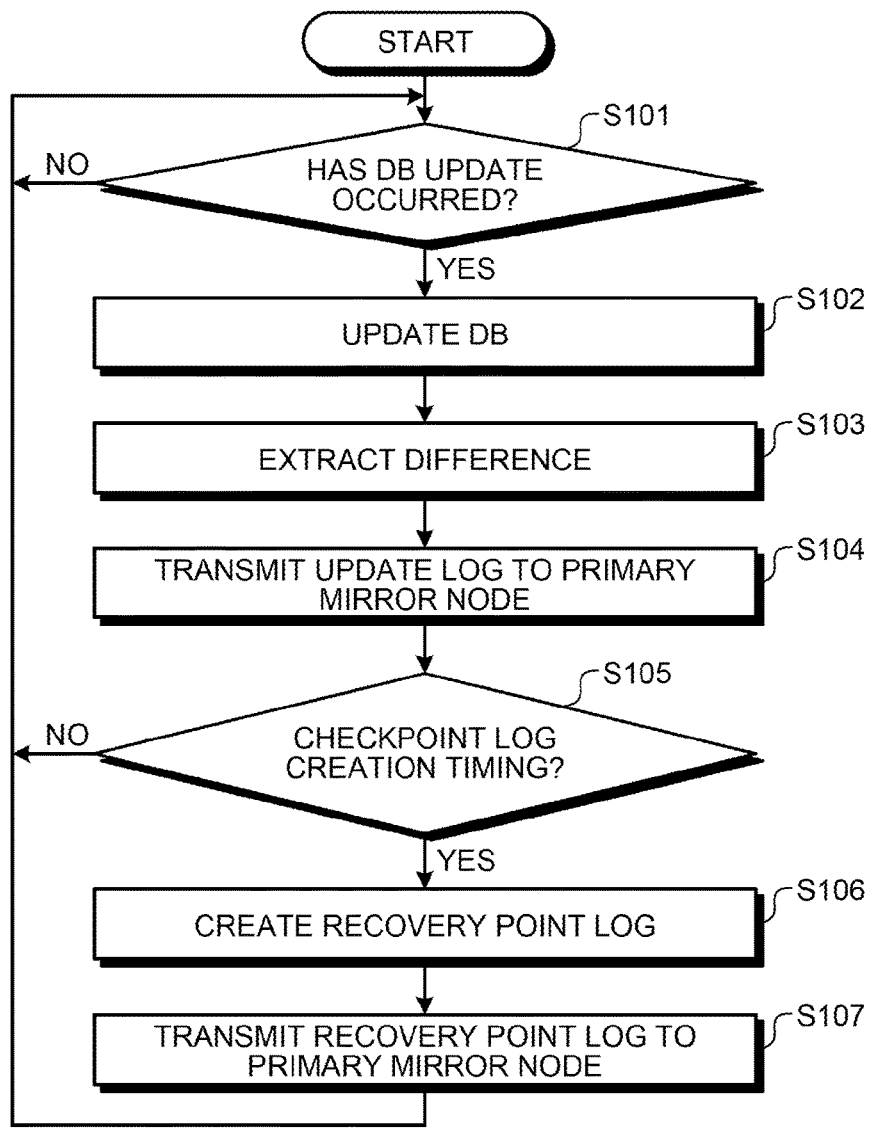
FIG. 9 is a flowchart illustrating the flow of a notification process from a primary master node to a primary mirror node.

FIG. 9 is a flowchart illustrating the flow of a notification process from the primary master node to the primary mirror node.

As illustrated in FIG. 9, if an update to the DB 12 occurs (S101: Yes), the DB updating unit 14 of the primary master node 10 updates the DB 12 (S102). Subsequently, the intra-center notifying unit 15 extracts a difference between before and after the update to the updated DB 12 (S103), creates an update log, and transmits the update log to the primary mirror node 20 (S104).

On the other hand, if it is checkpoint creation timing (S105: Yes), the inserting unit 16 creates a recovery point log including the serial number of a checkpoint (S106) and transmits the recovery point log to the primary mirror node 20 (S107). Note that if it is not checkpoint creation timing (S105: No), processing returns to S101 and the processes at and after S101 are performed.

Notification Process from the Primary Master Node 10 to the Secondary Master Node 50

Figure 10:
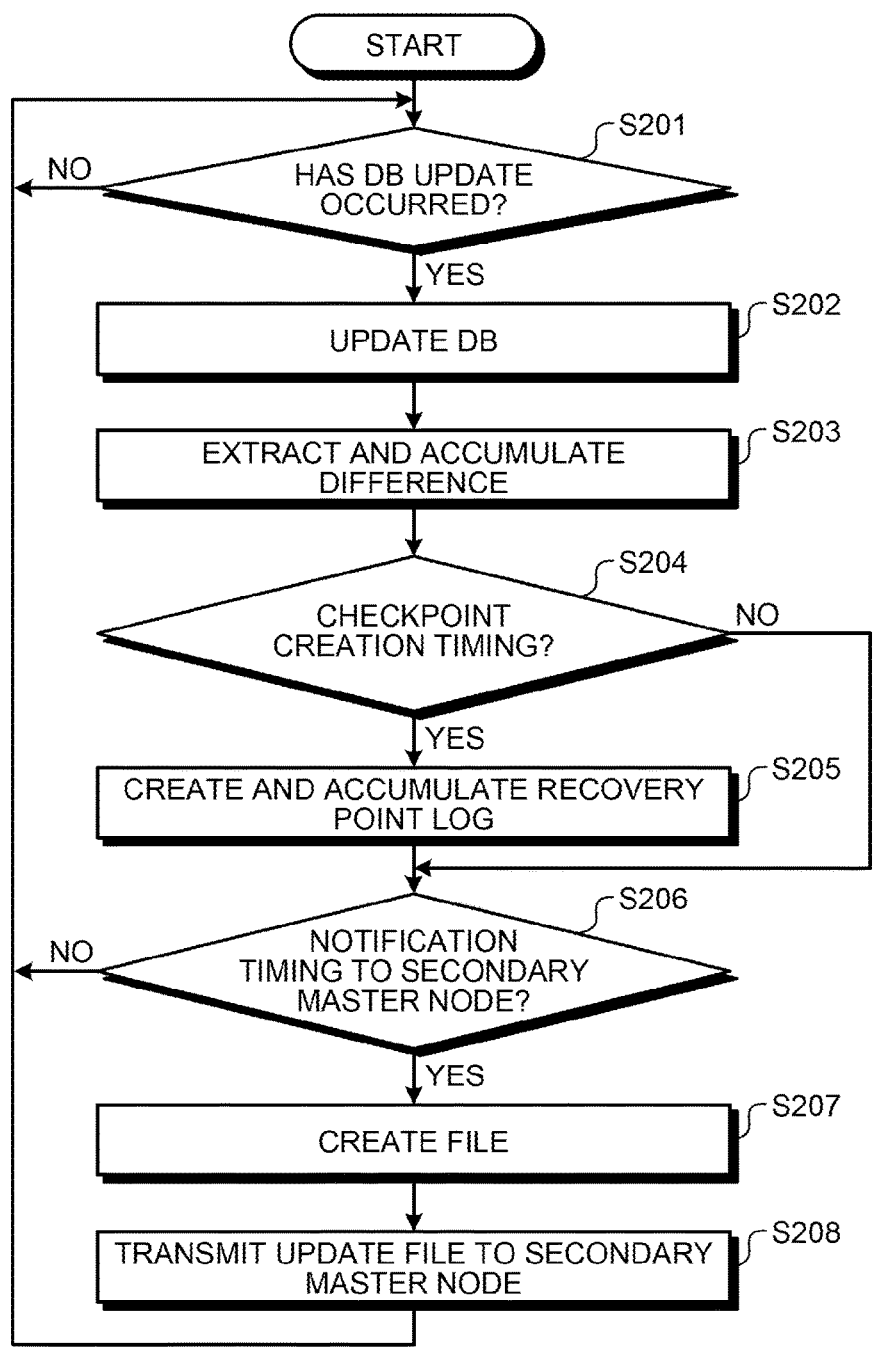
FIG. 10 is a flowchart illustrating the flow of a notification process from the primary master node to a secondary master node.

FIG. 10 is a flowchart illustrating the flow of a notification process from the primary master node to the secondary master node.

As illustrated in FIG. 10, if an update to the DB 12 occurs (S201: Yes), the DB updating unit 14 of the primary master node 10 updates the DB 12 (S202). Thereafter, the center-to-center notifying unit 17 extracts and accumulates a difference between before and after the update to the updated DB 12 (S203).

Meanwhile, if it is checkpoint creation timing (S204: Yes), the inserting unit 16 creates and accumulates a recovery point log including the serial number of a checkpoint (S205). Note that if it is not checkpoint creation timing (S204: No), S205 is not performed but S206 is performed.

Thereafter, if notification timing to the secondary master node 50 has reached (S206: Yes), the center-to-center notifying unit 17 creates an update file in which accumulated update logs and recovery point logs are described in the order of creation (S207). Then, the center-to-center notifying unit 17 transmits the created update file to the secondary master node 50 (S208). Note that if it is not notification timing to the secondary master node 50 (S206: No), processing returns to S201 and the processes at and after S201 are performed.

Update Process of the Primary Mirror Node 20

Figure 11:
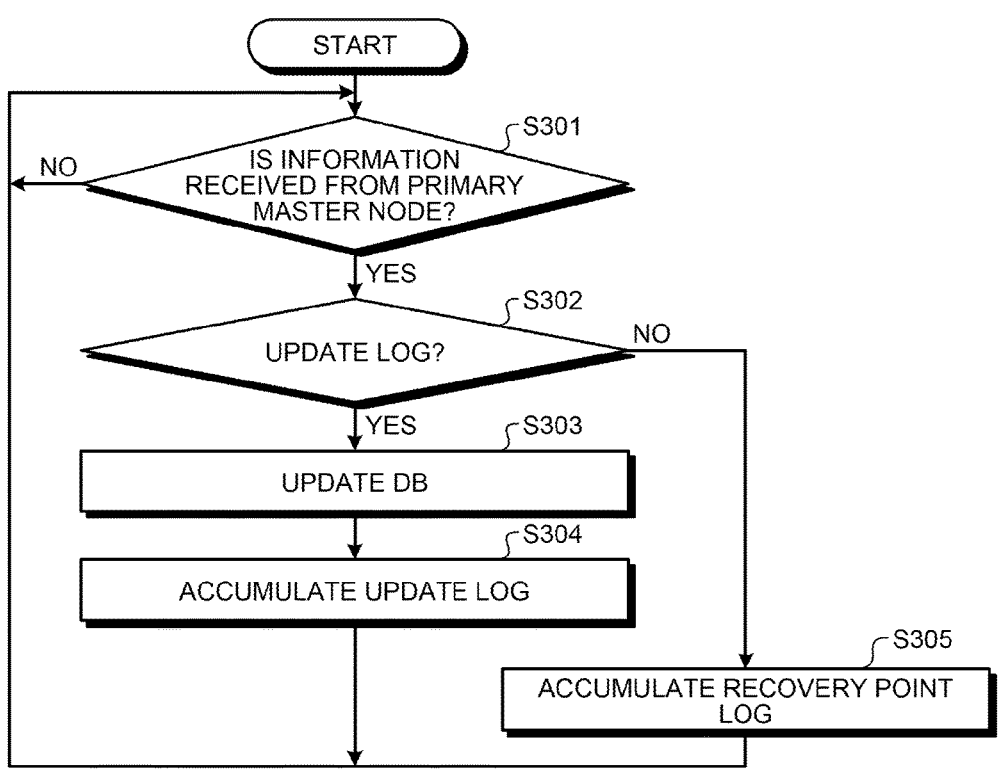
FIG. 11 is a flowchart illustrating the flow of an update process performed by the primary mirror node.

FIG. 11 is a flowchart illustrating the flow of an update process performed by the primary mirror node. As illustrated in FIG. 11, if the receiving unit 24 of the primary mirror node 20 receives information from the primary master node 10 (S301: Yes), the receiving unit 24 determines whether the received information is an update log (S302).

Subsequently, if the received information is an update log (S302: Yes), the DB updating unit 25 updates the DB 22 according to the received update log (S303) and accumulates the update log used for the update (S304).

On the other hand, if the received information is not an update log but is a recovery point log (S302: No), the DB updating unit 25 accumulates the received recovery point log in a storage unit or the like (S305).

Notification Process of the Primary Mirror Node 20

Figure 12:
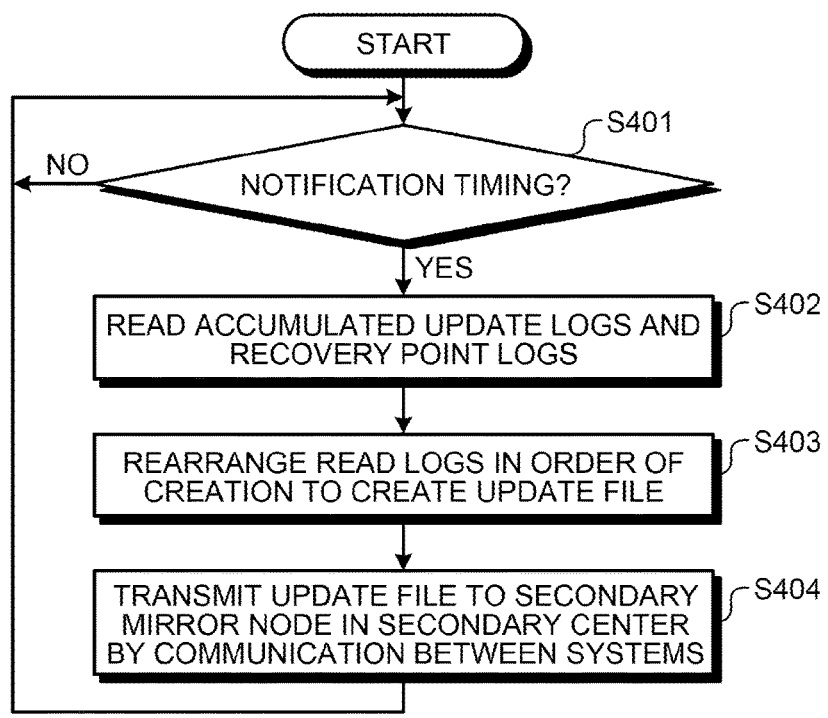
FIG. 12 is a flowchart illustrating the flow of a notification process performed by the primary mirror node.

FIG. 12 is a flowchart illustrating the flow of a notification process performed by the primary mirror node. As illustrated in FIG. 12, if notification timing has reached (S401: Yes), the center-to-center notifying unit 26 of the primary mirror node 20 reads accumulated update logs and recovery point logs (S402).

Thereafter, the center-to-center notifying unit 26 rearranges the read logs in the order of creation to create an update file (S403) and transmits the created update file to the secondary mirror node 60 in the secondary center 5 (S404).

Processes of the Secondary Master Node 50

Figure 13:
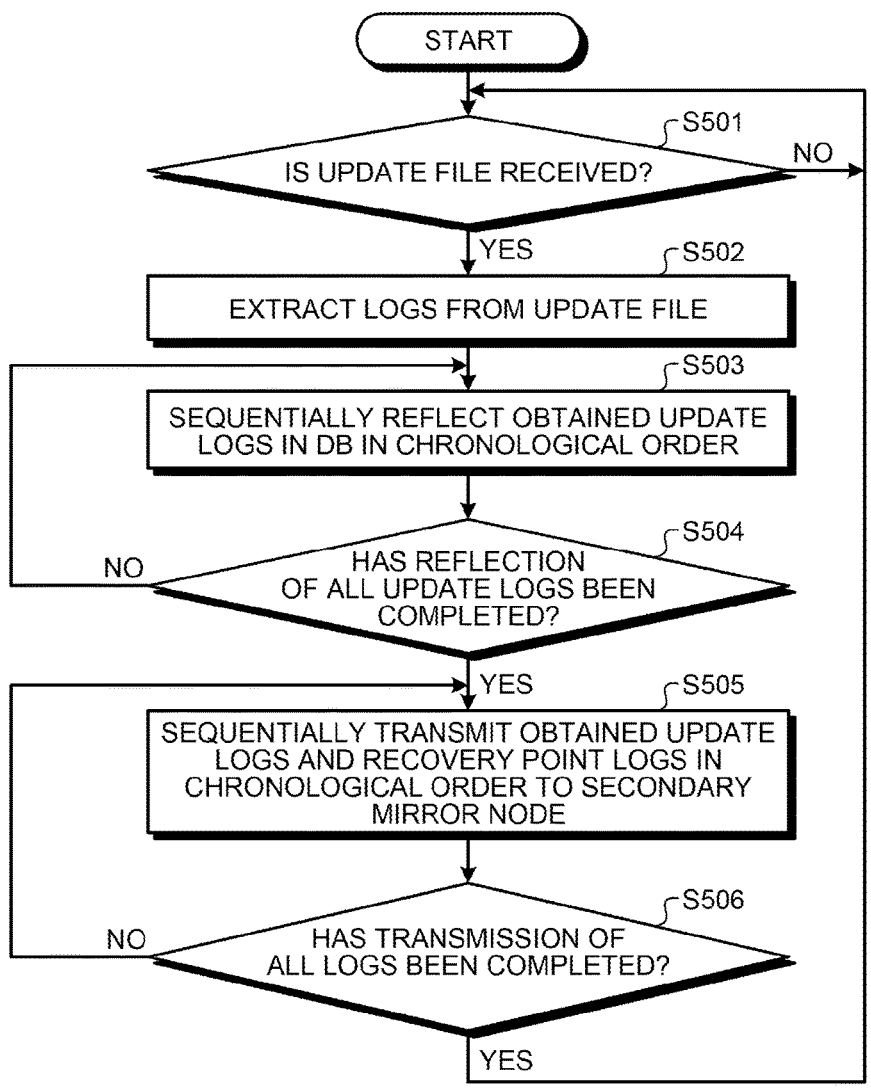
FIG. 13 is a flowchart illustrating the flow of update and notification processes performed by a secondary master node.

FIG. 13 is a flowchart illustrating the flow of update and notification processes performed by the secondary master node. As illustrated in FIG. 13, if an update file is received (S501: Yes), the DB updating unit 55 of the secondary master node 50 extracts logs included in the update file (S502).

Subsequently, the DB updating unit 55 sequentially reflects update logs among the obtained logs, in the DB 52 in chronological order of creation time (S503), and repeats such a process until reflection of all of the extracted update logs has been completed (S504: No).

Then, if reflection of all of the extracted update logs has been completed (S504: Yes), the intra-center notifying unit 56 sequentially transmits the update logs and recovery point logs which are obtained from the update file, in chronological order of creation time to the secondary mirror node 60 (S505). Thereafter, the intra-center notifying unit 56 repeats the process until transmission of all of the logs obtained from the update file has been completed (S506: No). If transmission of all of the logs has been completed (S506: Yes), processing returns to S501 and the processes at and after S501 are repeated.

Processes of the Secondary Mirror Node 60

Figure 14:
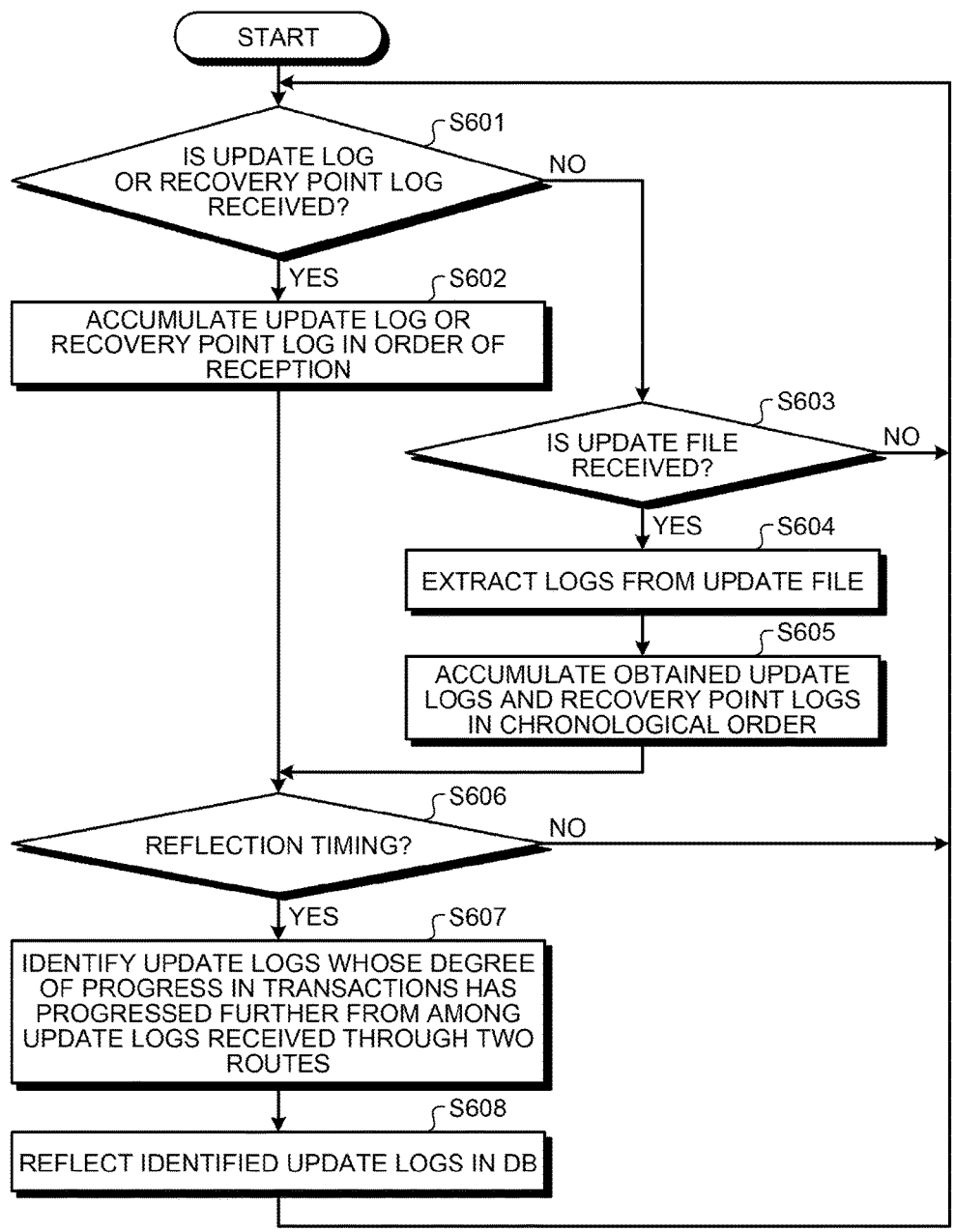
FIG. 14 is a flowchart illustrating the flow of an update process performed by the secondary mirror node.

FIG. 14 is a flowchart illustrating the flow of an update process performed by the secondary mirror node. As illustrated in FIG. 14, if the intra-center receiving unit 65 of the secondary mirror node 60 receives an update log or a recovery point log from the secondary master node 50 (S601: Yes), the intra-center receiving unit 65 accumulates the received update log or recovery point log in the buffer 63 in the order of reception (S602).

On the other hand, if the center-to-center receiving unit 66 receives an update file (S603: Yes) instead of an update log or a recovery point log (S601: No), the center-to-center receiving unit 66 extracts logs from the update file (S604). Subsequently, the center-to-center receiving unit 66 accumulates the obtained update logs and recovery point logs in the buffer 63 in chronological order of log creation time (S605).

Thereafter, until the timing of reflection in the DB 62 has reached (S606: No), processing returns to S601 and the processes at and after S601 are performed. Then, if the timing of reflection in the DB 62 has reached (S606: Yes), the identifying unit 67 identifies update logs whose transactions have progressed further from among the update logs received through two routes (S607).

Thereafter, the DB updating unit 68 reflects the update logs whose transactions have progressed further and which are identified by the identifying unit 67, in the DB 62 in the order in which the update logs are created (S608).

As described above, when the primary master node 10 transmits update information of the DB 12, the primary master node 10 periodically transmits a checkpoint. The secondary mirror node 60 receives update information and check points through two routes. Then, the secondary mirror node 60 can update the DB 62 using update information whose transactions have progressed further with reference to a check point. As a result, the secondary mirror node 60 can suppress data lost of update information for updating the DB 62.

In addition, when the primary master node 10 has updated the DB 12, the primary master node 10 transmits an update log to the primary mirror node 20. As a result, the primary mirror node 20 can allow the state of the DB 22 to be synchronized with that of the DB 12. In addition, the primary master node 10 periodically transmits an update file in which logs having been used to update the DB 12 are put together, to the secondary master node 50. As a result, the secondary master node 50 can update the DB 52 with reduced update time of the DB 12 and a reduced time lag.

Therefore, even when switching occurs within a system due to the occurrence of a failure, business operations can continue without delay, using a standby DB. In addition, even when switching occurs between the systems due to the occurrence of a failure in the primary center, business operations can continue without delay, using the DBs in the secondary center.

[b] Second Embodiment

Meanwhile, the first embodiment describes an example in which, for update logs received through each route, the numbers of update logs obtained after the latest recovery point are compared with each other to determine the degrees of progress in transactions, by which the latest update logs are identified. However, the configuration is not limited thereto.

For example, first, recovery point logs are compared with each other. If the recovery point logs are the same, the degrees of progress in transactions can also be determined. Hence, in a second embodiment, as another example of identifying the latest update logs, an example will be described in which first, recovery point logs are compared with each other, and when the recovery point logs are the same, the degrees of progress in transactions are determined.

Figure 15:
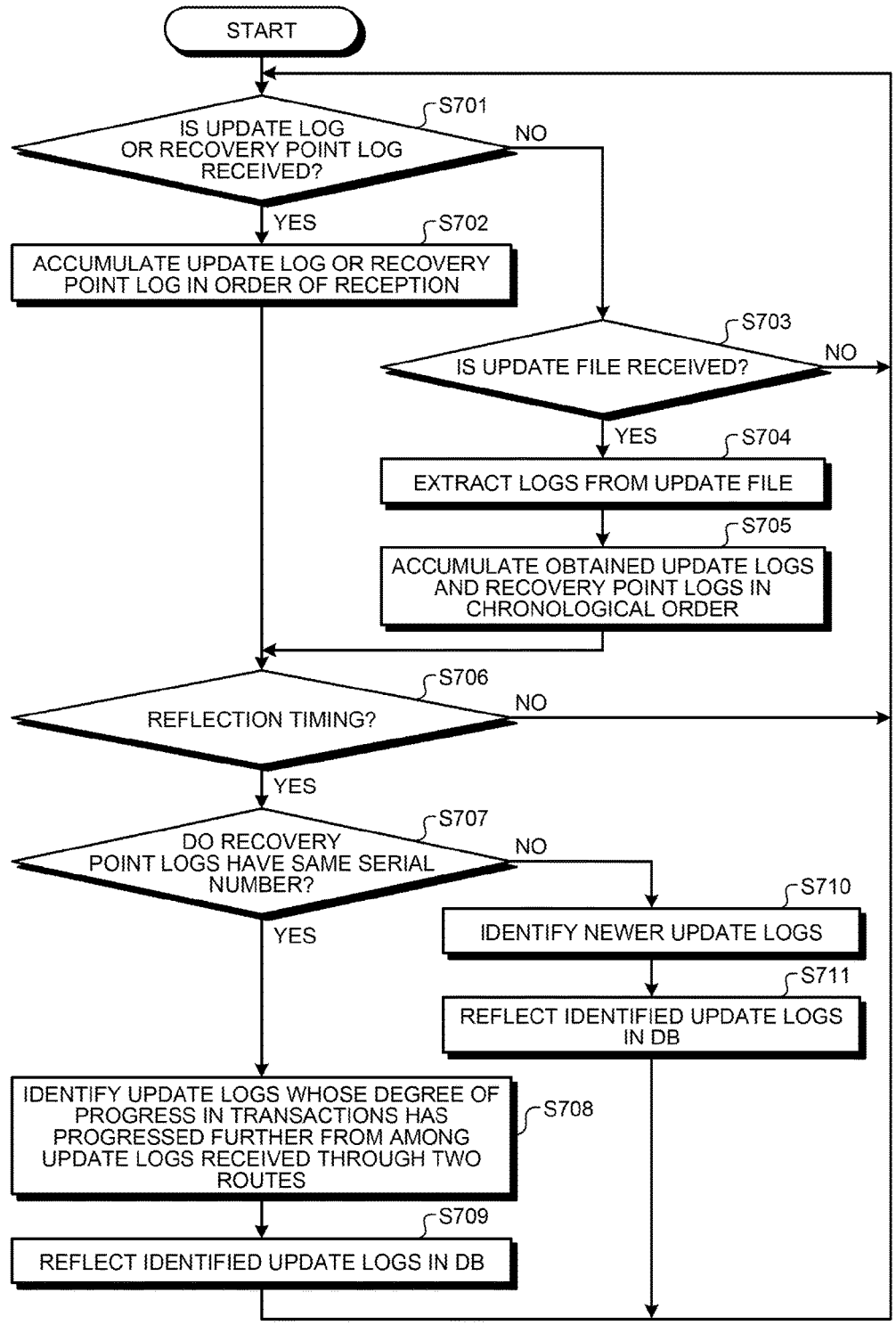
FIG. 15 is a flowchart illustrating the flow of an update process performed by a secondary mirror node according to a second embodiment.

FIG. 15 is a flowchart illustrating the flow of an update process performed by a secondary mirror node. As illustrated in FIG. 15, if an intra-center receiving unit 65 of a secondary mirror node 60 receives an update log or a recovery point log from a secondary master node (S701: Yes), the intra-center receiving unit 65 accumulates the received update log or recovery point log in a buffer 63 in the order of reception (S702).

On the other hand, if a center-to-center receiving unit 66 receives an update file (S703: Yes) instead of an update log or a recovery point log (S701: No), the center-to-center receiving unit 66 extracts logs from the update file (S704). Subsequently, the center-to-center receiving unit 66 accumulates the obtained update logs and recovery point logs in the buffer 63 in chronological order of log creation time (S705).

Thereafter, until the timing of reflection in a DB 62 has reached (S706: No), processing returns to S701 and the processes at and after S701 are performed. Then, if the timing of reflection in the DB 62 has reached (S706: Yes), an identifying unit 67 determines whether the accumulated recovery point logs for the two systems have the same serial number (S707). For example, the identifying unit 67 compares the serial number of the latest recovery point log received by the intra-center receiving unit 65 with the serial number of the latest recovery point log received by the center-to-center receiving unit 66.

Then, if the recovery point logs have the same serial number (S707: Yes), the identifying unit 67 identifies, from the update logs received through two routes, update logs whose transactions have progressed further (S708). Thereafter, a DB updating unit 68 reflects the update logs whose transactions have progressed further and which are identified by the identifying unit 67, in the DB 62 in the order in which the update logs are created (S709).

On the other hand, if the recovery point logs have different serial numbers (S707: No), the identifying unit 67 identifies update logs received through a route with a newer serial number of the recovery point log, as update logs whose processes have progressed further (S710). Thereafter, the DB updating unit 68 reflects each of the update logs whose processes have progressed further and which are identified by the identifying unit 67, in the DB 62 in the order of creation (S711).

As such, when the secondary mirror node 60 can determine, by recovery point logs, which update log is newer, the secondary mirror node 60 omits a determination by the degrees of progress in transactions, and reflects the newer update log in the DB 62. In addition, when the secondary mirror node 60 is unable to determine, by recovery point logs, which update log is newer, the secondary mirror node 60 performs a determination by the degrees of progress in transactions. As a result, the secondary mirror node 60 can update the DB 62 more quickly, enabling to reduce the number of data losses for when system switching occurs with update logs not reflected.

[c] Third Embodiment

Next, a third embodiment describes system switching performed when a failure occurs in a primary master node 10 in a DB quad-redundant system described in the first embodiment.

In addition, although the first embodiment describes an example in which a secondary mirror node 60 accumulates update logs received through each route and identifies and reflects, at predetermined timing, update information whose transactions have progressed further, the method of reflection in a DB is not limited thereto.

For example, the secondary mirror node 60 accumulates update information received from a primary mirror node 20, and reflects update information received from a secondary master node 50, in the DB 62. Then, when system switching occurs, the secondary mirror node 60 determines whether the update information received from the primary mirror node 20 is the latest information. If the information is the latest one, the secondary mirror node 60 reflects the update information and then can perform system switching.

Hence, the third embodiment describes a DB update process of the secondary mirror node which is different than that of the first embodiment, and a system switching process.

Overall Configuration

Figure 16:
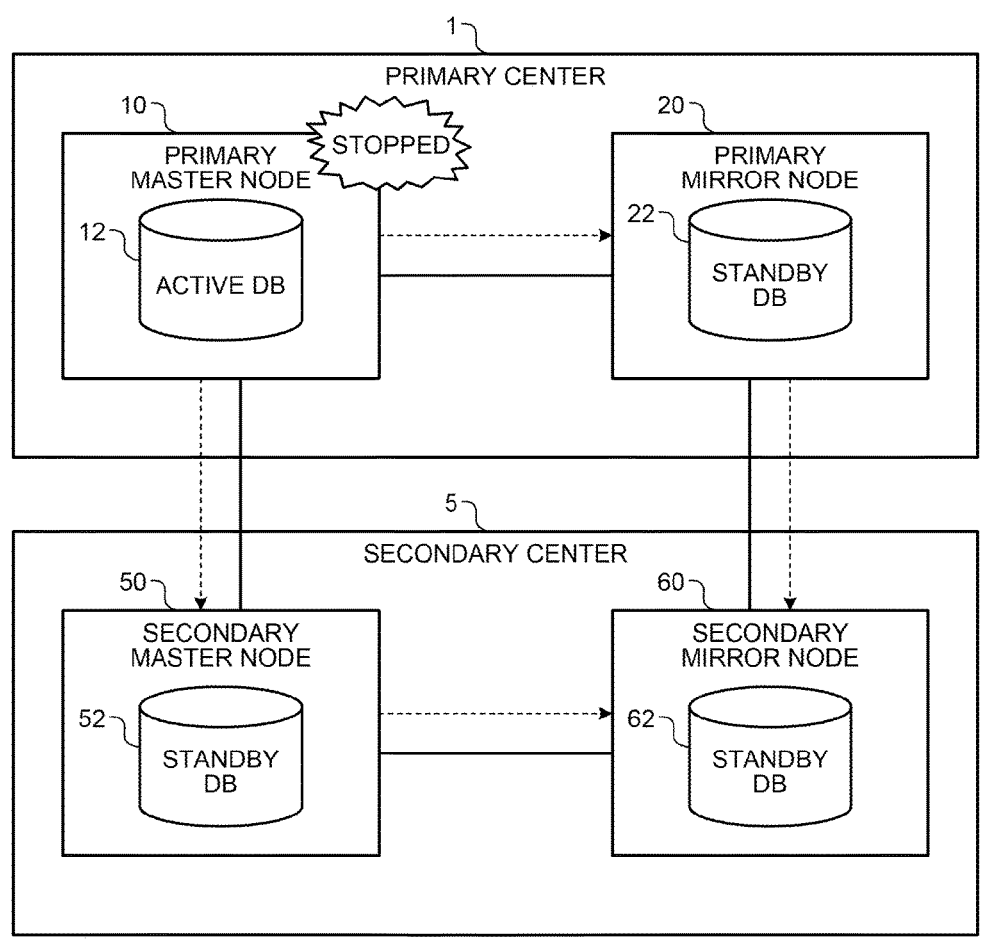
FIG. 16 is a diagram describing an example of the occurrence of a failure in a redundant system according to a third embodiment.

FIG. 16 is a diagram describing an example of the occurrence of a failure in a redundant system according to the third embodiment. As illustrated in FIG. 16, the overall configuration is the same as that of FIG. 1 and thus a detailed description thereof is omitted.

In addition, dotted lines illustrated in FIG. 16 indicate the flow of update logs and recovery point logs. Specifically, as in the first embodiment, the primary master node 10 transmits update logs and recovery point logs to both of the primary mirror node 20 and the secondary master node 50. The primary mirror node 20 and the secondary master node 50 transmit the update logs and recovery point logs which are received from the primary master node 10, to the secondary mirror node 60. The secondary mirror node 60 receives the update logs and recovery point logs of the primary master node 10 through two routes.

In such a state, when, as illustrated in FIG. 16, the primary master node 10 is stopped due to a failure, etc., system switching occurs. Note that, for a trigger for the occurrence of system switching, an administrator's terminal may notify each node, or the primary master node 10 may notify the primary mirror node 20 of the occurrence of a failure. As another example, it is also possible that the primary mirror node 20 performs alive monitoring by periodically issuing ping (Packet Internet Groper) to the primary master node 10, and when the primary mirror node 20 has not been able to detect a response, system switching is performed.

Figure 17:
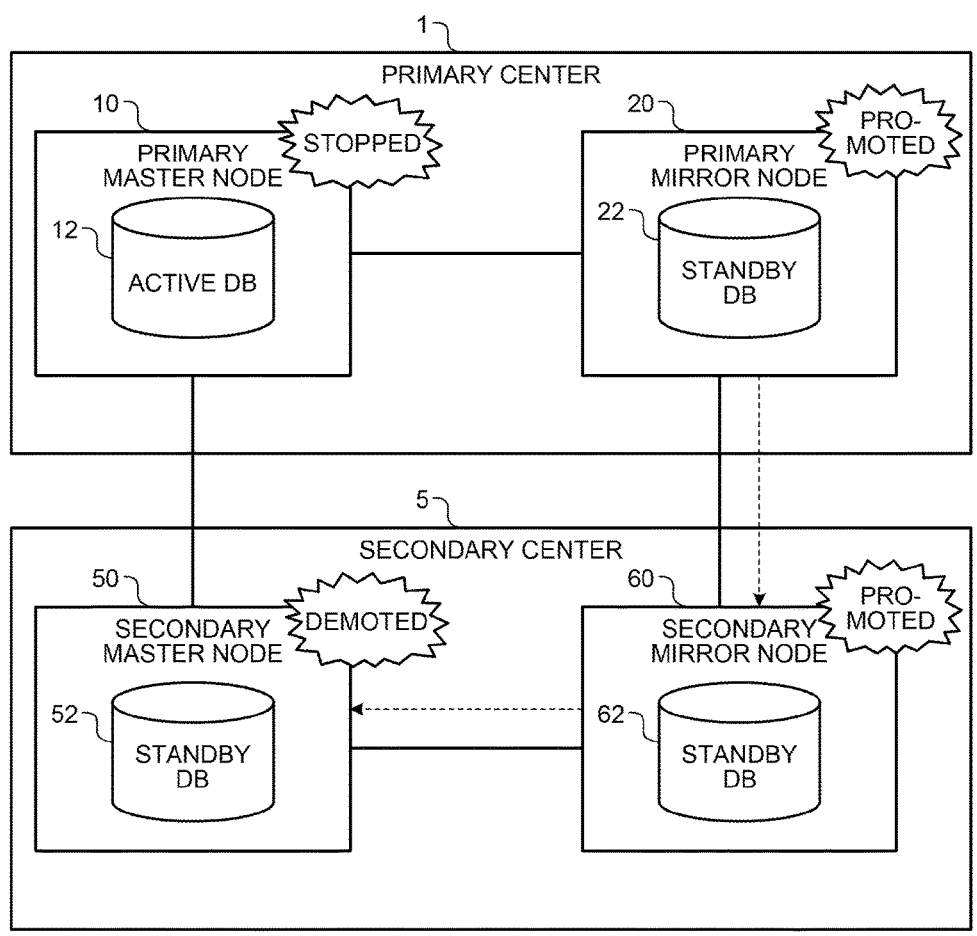
FIG. 17 is a diagram describing an example of system switching of the redundant system according to the third embodiment.

FIG. 17 is a diagram describing an example of system switching of the redundant system according to the third embodiment. When, as illustrated in FIG. 17, the primary master node 10 is stopped, the primary mirror node 20 is promoted to a master node in a primary system, the secondary mirror node 60 is promoted to a master node in a secondary system, and the secondary master node 50 is demoted to a mirror node in the secondary system. As a result, a standby DB 22 of the primary mirror node 20 is promoted to an active DB, and thus, the DB 22 is updated along with the execution of an application.

Then, when the standby DB 22 is updated, the primary mirror node 20 transmits an update file including update logs and recovery point logs to the secondary mirror node 60. The secondary mirror node 60 updates a standby DB 62 according to the update logs included in the received update file. Then, the secondary mirror node 60 transmits the update logs and recovery point logs included in the received update file to the secondary master node 50. The secondary master node 50 updates a standby DB 52 according to the received update logs.

Update Process of the Secondary Mirror Node

Figure 18:
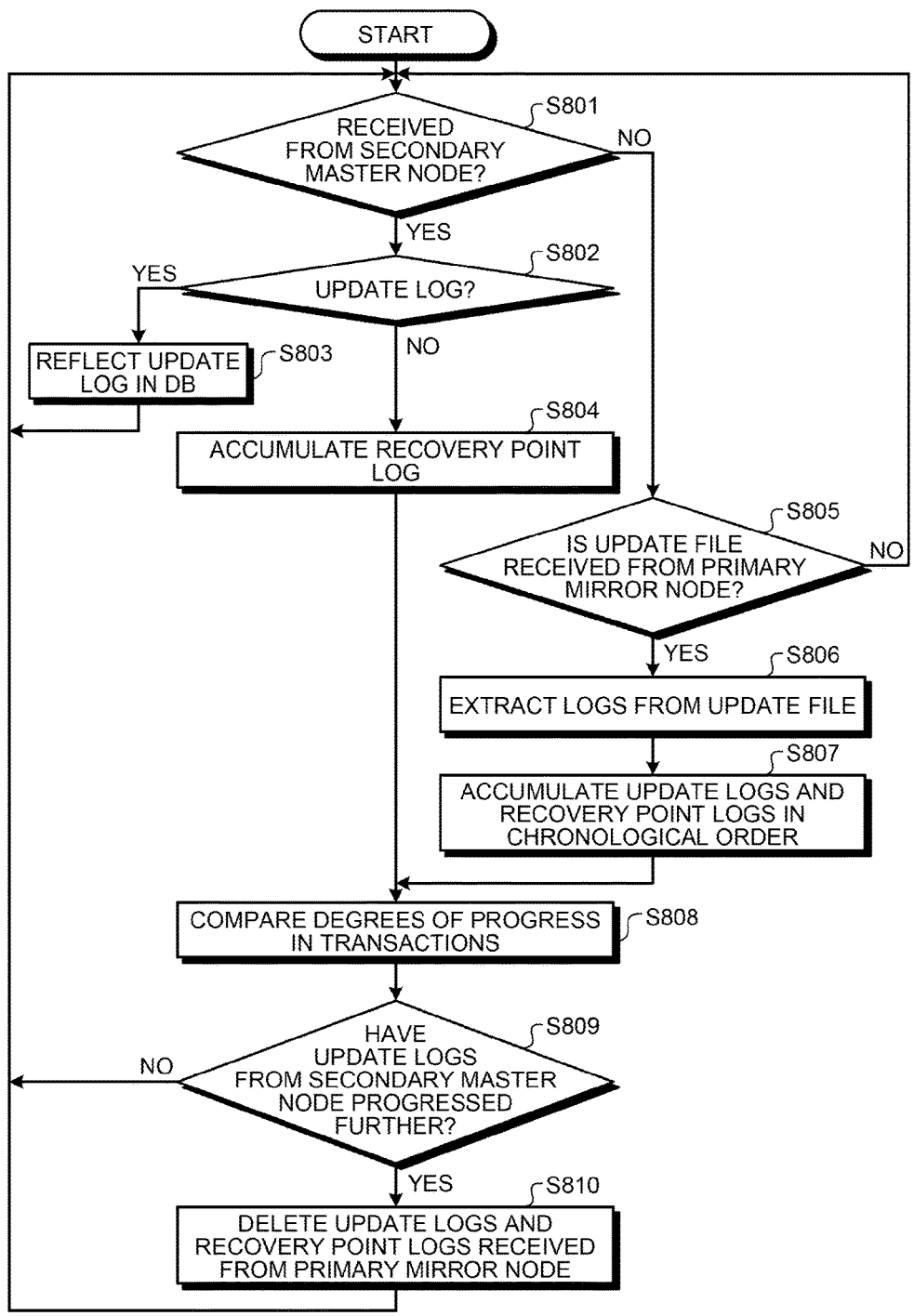
FIG. 18 is a flowchart illustrating the flow of an update process performed by a secondary mirror node according to the third embodiment.

FIG. 18 is a flowchart illustrating the flow of an update process performed by the secondary mirror node according to the third embodiment. Note that the process described here is an update process performed before system switching.

As illustrated in FIG. 18, if an intra-center receiving unit 65 receives information from the secondary master node 50 (S801: Yes), a DB updating unit 68 of the secondary mirror node 60 determines whether the received information is an update log (S802).

Then, if the received information is an update log (S802: Yes), the DB updating unit 68 reflects the received update log in the DB 62 and thereby updates the DB 62 (S803). On the other hand, if the received information is not an update log but is a recovery point log (S802: No), the DB updating unit 68 accumulates the recovery point log in a buffer 63 or the like (S804).

In addition, if, at S801, a center-to-center receiving unit 66 receives an update file from the primary mirror node 20 instead of from the secondary master node 50 (S801: No and S805: Yes), the center-to-center receiving unit 66 extracts logs from the update file (S806). Then, the center-to-center receiving unit 66 accumulates the obtained update logs and recovery point logs in the buffer 63 in chronological order of log creation time (S807).

Thereafter, the DB updating unit 68 compares, at pre-specified intervals, the degrees of progress in transactions, using update logs and recovery point logs stored in the buffer 63 (S808).

Then, if the DB updating unit 68 determines that the transactions of the update logs from the secondary master node 50 have progressed further (S809: Yes), the DB updating unit 68 performs S810. Specifically, the DB updating unit 68 deletes the update logs and recovery point logs received from the primary mirror node 20, from the buffer 63 (S810).

On the other hand, if the DB updating unit 68 determines that the transactions of the update logs from the primary mirror node 20 have progressed further (S809: No), the DB updating unit 68 repeats the processes at and after S801, with the update logs and recovery point logs received from the primary mirror node 20 remaining in the buffer 63.

System Switching Process of the Secondary Mirror Node

Figure 19:
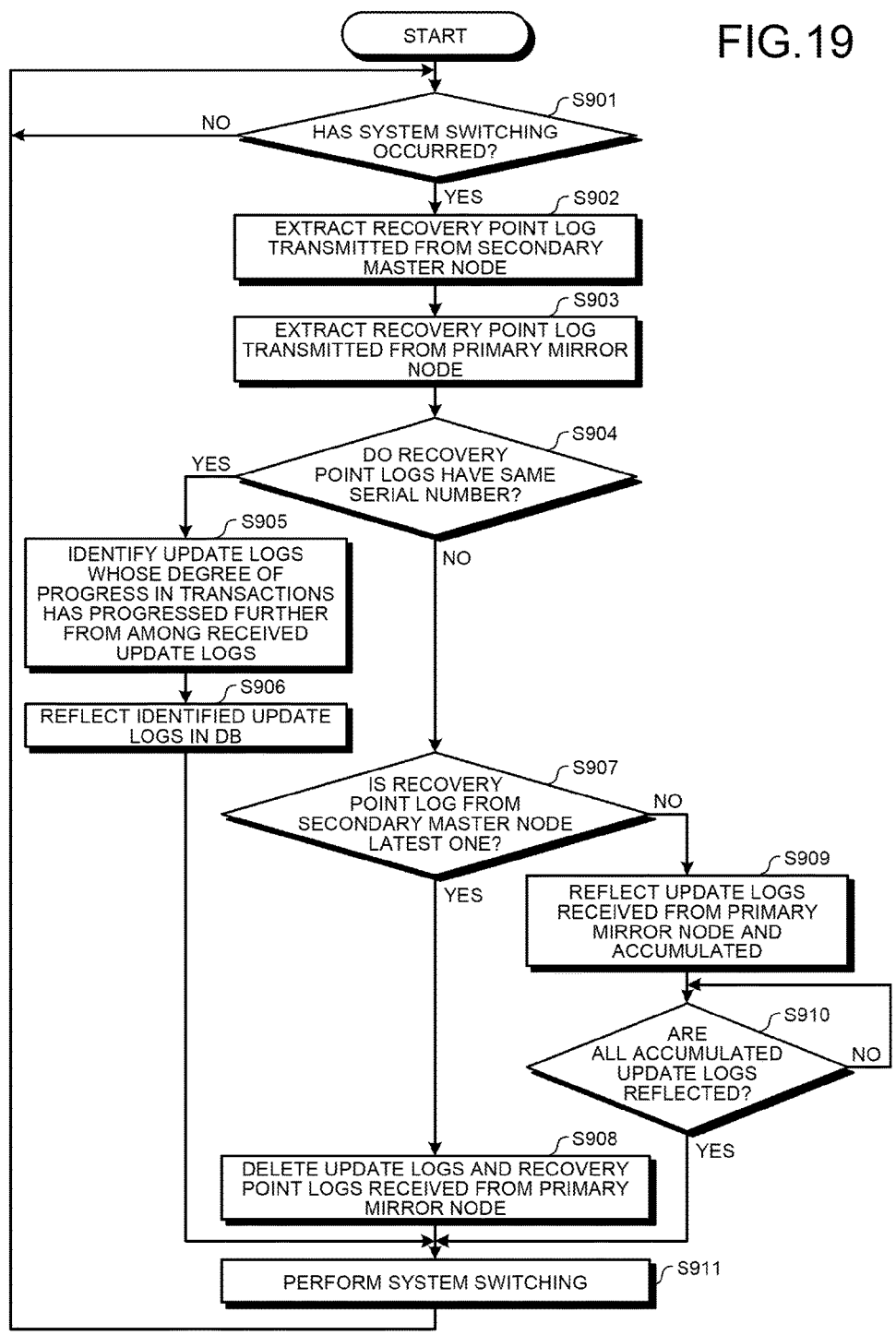
FIG. 19 is a flowchart illustrating the flow of a system switching process performed by the secondary mirror node according to the third embodiment.

FIG. 19 is a flowchart illustrating the flow of a system switching process performed by the secondary mirror node according to the third embodiment. As illustrated in FIG. 19, the DB updating unit 68 of the secondary mirror node 60, if system switching occurs (S901: Yes), extracts the latest recovery point log transmitted from the secondary master node 50 and the latest recovery point log transmitted from the primary mirror node 20 from the buffer 63 (S902 and S903).

Giving an example, the DB updating unit 68 of the secondary mirror node 60 detects the occurrence of system switching by receiving a switching notification from the primary mirror node 20 having detected a stop of the primary master node 10 or by receiving a switching instruction from the administrator's terminal.

Then, if the recovery point logs have the same serial number (S904: Yes), an identifying unit 67 identifies, from the update logs received through the two routes, update logs whose transactions have progressed further (S905). Thereafter, the DB updating unit 68 reflects the update logs whose transactions have progressed further and which are identified by the identifying unit 67, in the DB 62 in the order in which the update logs are created (S906).

On the other hand, if the recovery point logs have different serial numbers (S904: No), the identifying unit 67 determines whether the serial number of the recovery point log from the secondary master node 50 is newer, i.e., the recovery point log from the secondary master node 50 is the latest one (S907).

Then, if the recovery point log from the secondary master node 50 is the latest one (S907: Yes), the identifying unit 67 deletes the update logs and recovery point logs received from the primary mirror node 20, from the buffer 63 (S908).

On the other hand, if the recovery point log from the secondary master node 50 is not the latest one but the recovery point log from the primary mirror node 20 is the latest one (S907: No), the DB updating unit 68 performs S909.

Specifically, the DB updating unit 68 reflects the update logs received from the primary mirror node 20 and accumulated in the buffer 63, in the DB 62 and thereby updates the DB 62 (S909), and repeatedly performs such a process until reflection of all of the accumulated update logs has been completed (S910: No).

Thereafter, if reflection of all of the accumulated update logs at S910 has been completed (S910: Yes) or when performance of S906 has been completed, the DB updating unit 68 performs system switching (S911). That is, the DB updating unit 68 performs the same processes as those performed by the secondary master node 50 which are described in the first embodiment, and behaves as a master node in the secondary system.

At this time, the DB updating unit 68 of the secondary mirror node 60 notifies the secondary master node 50 of the occurrence of system switching, and the secondary master node 50 performs the functions of a mirror node in the secondary system. That is, the secondary master node 50 behaves as a general DB dual-redundant mirror DB.

As such, in the DB quad-redundant system, even when the primary master node 10 is stopped, since each node can operate by automatically changing its role, business operations can continue, leading to an improvement in reliability.

In addition, since the secondary mirror node 60 can sequentially reflect update logs received from the secondary master node 50 until system switching occurs, the state of the DB 62 can be maintained to be more latest compared to the first embodiment. Therefore, even when the secondary master node 50 is stopped, the secondary mirror node 60 can maintain the functions as a backup while suppressing data lost.

[d] Fourth Embodiment

Although the embodiments of the present invention have been described so far, in addition to the above-described embodiments, the present invention may be implemented in various different modes.

Checkpoint

Although the above-described embodiments describe an example in which a recovery point log including a unique serial number in a system is used as a checkpoint, the configuration is not limited thereto. For example, a recovery point log including a date and time, a time, etc., can also be used. That is, various information can be used as long as the information can specify a unique order such as an ascending order or a descending order in the system.

System

In addition, of the processes described in the embodiments, all or some of those processes described as being performed automatically can also be performed manually. Alternatively, all or some of those processes described as being performed manually can also be performed automatically by publicly known methods. In addition, information including processing procedures, control procedures, specific names, various types of data, and parameters illustrated in the above-described document and drawings can be arbitrarily changed unless otherwise indicated.

In addition, each component of each apparatus illustrated in the drawings is functionally conceptual and thus does not always physically configured as illustrated in the drawings. Namely, a specific mode of separation or integration of each apparatus is not limited to that illustrated in the drawings. That is, all or some of the components can be configured by separating or integrating them functionally or physically in any unit, according to various types of loads, the status of use, etc. Furthermore, all or arbitrary ones of processing functions performed by each apparatus can be implemented by a CPU and a program analyzed and executed by the CPU or implemented by wired logic hardware.

Hardware

Figure 20:
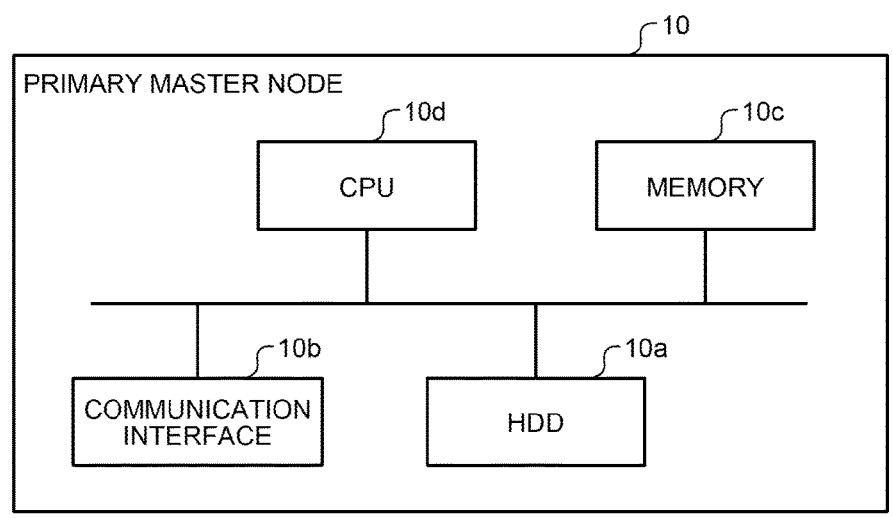
FIG. 20 is a diagram describing an exemplary hardware configuration.

FIG. 20 is a diagram describing an exemplary hardware configuration. Since the nodes illustrated in FIG. 1 have the same hardware configuration, here, as an example, a description is made using the primary master node 10 as an example.

As illustrated in FIG. 20, the primary master node 10 includes an HDD (Hard Disk Drive) 10a, a communication interface 10b, a memory 10c, and a CPU (Central Processing Unit) 10d. In addition, the components illustrated in FIG. 20 are connected to each other by a bus or the like. Note that the hardware illustrated here is an example and thus the primary master node 10 may include other hardware, e.g., a graphics interface and a mouse.

The HDD 10a stores a program that causes the functions illustrated in FIG. 2, etc., to operate, and a DB. The communication interface 10b is an interface that controls communication with other apparatuses and is a network interface card, for example.

The CPU 10d reads a program that performs the same processes as those of the processors illustrated in FIG. 2, etc., from the HDD 10a or the like and expands the program in the memory 10c, and thereby allows processes that perform the functions described in FIG. 2, etc., to operate. Namely, the processes perform the same functions as those of the processors included in the primary master node 10. Specifically, the CPU 10d reads a program having the same functions as the DB updating unit 14, the intra-center notifying unit 15, the inserting unit 16, the center-to-center notifying unit 17, etc., from the HDD 10a or the like. Then, the CPU 10d performs processes that perform the same processes as those of the DB updating unit 14, the intra-center notifying unit 15, the inserting unit 16, and the center-to-center notifying unit 17.

As such, the primary master node 10 operates as an information processing apparatus that performs a redundancy method by reading and executing a program. In addition, the primary master node 10 can also implement the same functions as those in the above-described embodiments, by reading the above-described program from a recording medium by a medium reading apparatus and executing the read program. Note that a program referred to in other embodiments is not limited to being executed by the primary master node 10. For example, when another computer or server executes a program or when the computer and the server execute a program in cooperation with each other, too, the present invention can be applied in the same manner.

In one aspect, an increase in data lost in reflection of update information can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A redundant system comprising:
    a primary system including:
        a first node; and
        a second node that backs up the first node; and
    a secondary system including:
        a third node; and
        a fourth node that backs up the third node, wherein
    the first node in the primary system includes:
        a processor that executes a first process including transmitting data update information to the second node and the third node, the data update information being generated in response to a data update in the first node, and
    the fourth node in the secondary system includes:
        a processor that executes a second process including:
            determining a degree of progress in transactions indicated by the data update information obtained through the second node and a degree of progress in transactions indicated by the data update information obtained through the third node, specifying the data update information indicating a further progressed transaction, and reflecting the specified data update information to stored data of the fourth node, wherein the first process includes inserting, when transmitting the data update information to the second node and the third node, one or a plurality of pieces of delimiter information into both of transmit data, and the determining includes determining each of the degrees of progress in transactions based on a number of transactions indicated by the data update information later than a last piece of delimiter information included in the obtained data update information.

2. The redundant system according to claim 1, wherein the one or the plurality of pieces of delimiter information includes order information indicating a transmission order, and, wherein the determining includes determining the degrees of progress in transactions when first order information indicated by a last piece of delimiter information included in the data update information obtained from the second node and second order information indicated by a last piece of delimiter information included in the data update information obtained through the third node indicate a same order, and the reflecting includes reflecting the data update information including further progressed update information among the data update information obtained from the second node and the data update information obtained through the third node to the stored data when the first order information and the second order information are different.

3. The redundant system according to claim 1, wherein in response to a stop of the first node, the specifying includes specifying the data update information indicating the further progressed transaction, and the reflecting includes reflecting the specified data update information in the stored data of the fourth node, and, wherein the second process further includes performing control to switch the fourth node to a primary node in the secondary system, when the reflection of the update information indicating the further progressed transaction completes.

4. A method for a redundant system, the method comprising:

transmitting, by a first node of a primary system, data update information to a second node that backs up the first node and a third node of a secondary system, the data update information being generated in response to a data update in the first node, and determining, by a fourth node that backs up the third node, a degree of progress in transactions indicated by the data update information obtained through the second node and a degree of progress in transactions indicated by the data update information obtained through the third node, specifying, by the fourth node, data update information indicating a further progressed transaction, and reflecting, by the fourth node, the specified data update information to stored data of the fourth node, wherein the transmitting includes inserting, when transmitting the data update information to the second node and the third node, one or a plurality of pieces of delimiter information into both of transmit data, and the determining includes determining each of the degrees of progress in transactions based on a number of transactions indicated by the data update information later than a last piece of delimiter information included in the obtained data update information.

5. A non-transitory computer-readable recording medium having stored therein a program that causes a computer to execute a process comprising:

determining a degree of progress in transactions indicated by data update information obtained through a second node that backs up a first node of a primary system and a degree of progress in transactions indicated by data update information obtained through the third node of a secondary system, specifying the data update information indicating a further progressed transaction, and reflecting the specified data update information in stored data of the computer in corresponding to a fourth node that backs up the third node, wherein the process includes inserting, when transmitting the data update information to the second node and the third node, one or a plurality of pieces of delimiter information into both of transmit data, and the determining includes determining each of the degrees of progress in transactions based on a number of transactions indicated by the data update information later than a last piece of delimiter information included in the obtained data update information.

* * * * *